United States Patent
Ikeda et al.

(10) Patent No.: US 9,549,139 B2
(45) Date of Patent: Jan. 17, 2017

(54) IMAGING APPARATUS, IMAGING SYSTEM, AND METHOD FOR DRIVING IMAGING APPARATUS

(71) Applicant: CANON KABUSHIKI KAISHA, Tokyo (JP)

(72) Inventors: Yasuji Ikeda, Kawasaki (JP); Hiroki Hiyama, Sagamihara (JP); Yu Arishima, Yokohama (JP); Seiji Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 14/452,945

(22) Filed: Aug. 6, 2014

(65) Prior Publication Data
US 2015/0062394 A1   Mar. 5, 2015

(30) Foreign Application Priority Data

Aug. 28, 2013 (JP) ................................. 2013-176799

(51) Int. Cl.
H04N 5/335 (2011.01)
H04N 5/378 (2011.01)
H04N 5/347 (2011.01)
H04N 5/3745 (2011.01)
H04N 5/345 (2011.01)

(52) U.S. Cl.
CPC .............. *H04N 5/378* (2013.01); *H04N 5/345* (2013.01); *H04N 5/347* (2013.01); *H04N 5/37457* (2013.01)

(58) Field of Classification Search
CPC ........ H04N 9/045; H04N 5/378; H04N 5/345; H04N 5/37457; H04N 5/347
See application file for complete search history.

(56) References Cited

U.S. PATENT DOCUMENTS

| | | |
|---|---|---|
| 6,188,094 B1 | 2/2001 | Kochi et al. |
| 6,670,990 B1 | 12/2003 | Kochi et al. |
| 6,960,751 B2 | 11/2005 | Hiyama et al. |
| 7,187,052 B2 | 3/2007 | Okita et al. |
| 7,283,305 B2 | 10/2007 | Okita et al. |

(Continued)

FOREIGN PATENT DOCUMENTS

| | | |
|---|---|---|
| EP | 1085751 A2 | 3/2001 |
| JP | 2009-124550 | 6/2009 |

(Continued)

OTHER PUBLICATIONS

English Translation JP 2012-214452.*
Korean Office Action issued Jun. 13, 2016 during prosecution of related Korean application No. 10-2014-0108217.

*Primary Examiner* — Aung S Moe
*Assistant Examiner* — John H Moorehead, III
(74) *Attorney, Agent, or Firm* — Fitzpatrick, Cella, Harper & Scinto

(57) ABSTRACT

The imaging apparatus has a plurality of pixels each of which has a plurality of photoelectric conversion units; generates a plurality of first combined signals obtained by combining signals based on electric charges of photoelectric conversion units in one side with each other, and a plurality of second signals obtained by combining signals based on electric charges of the plurality of photoelectric conversion units with each other; and outputs a part of the first combined signals out of the plurality of first combined signals.

23 Claims, 12 Drawing Sheets

(56) References Cited

U.S. PATENT DOCUMENTS

| | | |
|---|---|---|
| 7,429,764 B2 | 9/2008 | Koizumi et al. |
| 7,538,804 B2 | 5/2009 | Okita et al. |
| 7,557,847 B2 | 7/2009 | Okita et al. |
| 7,638,826 B2 | 12/2009 | Hiyama et al. |
| 7,755,688 B2 | 7/2010 | Hatano et al. |
| 7,812,873 B2 | 10/2010 | Hiyama et al. |
| 7,812,876 B2 | 10/2010 | Hiyama et al. |
| 7,859,575 B2 | 12/2010 | Ota et al. |
| 8,045,034 B2 | 10/2011 | Shibata et al. |
| 8,106,343 B2 | 1/2012 | Arishima et al. |
| 8,106,955 B2 | 1/2012 | Okita et al. |
| 8,120,686 B2 | 2/2012 | Hatano et al. |
| 8,189,086 B2 | 5/2012 | Hashimoto et al. |
| 8,208,055 B2 | 6/2012 | Hiyama |
| 8,218,050 B2 | 7/2012 | Ogura et al. |
| 8,310,576 B2 | 11/2012 | Hashimoto et al. |
| 8,325,260 B2 | 12/2012 | Yamazaki et al. |
| 8,466,401 B2 | 6/2013 | Arishima et al. |
| 8,493,487 B2 | 7/2013 | Takada et al. |
| 8,507,870 B2 | 8/2013 | Arishima et al. |
| 8,530,989 B2 | 9/2013 | Kikuchi et al. |
| 8,553,115 B2 | 10/2013 | Arishima et al. |
| 8,598,901 B2 | 12/2013 | Hiyama et al. |
| 8,710,610 B2 | 4/2014 | Kono et al. |
| 8,785,832 B2 | 7/2014 | Ikeda |
| 8,836,833 B2 | 9/2014 | Yamashita et al. |
| 8,836,838 B2 | 9/2014 | Nakamura et al. |
| 8,988,593 B2 * | 3/2015 | Okado .................... G02B 7/34 348/349 |
| 2001/0036361 A1 | 11/2001 | Suda |
| 2009/0128678 A1 * | 5/2009 | Kitami ............... H04N 5/23245 348/308 |
| 2012/0008030 A1 | 1/2012 | Kono et al. |
| 2012/0038801 A1 * | 2/2012 | Yamada ............... H04N 5/3458 348/278 |
| 2012/0140089 A1 * | 6/2012 | Koh .................... H04N 5/23245 348/220.1 |
| 2012/0327279 A1 | 12/2012 | Hashimoto et al. |
| 2013/0026343 A1 | 1/2013 | Saito et al. |
| 2013/0062503 A1 | 3/2013 | Saito et al. |
| 2013/0068930 A1 | 3/2013 | Nakamura et al. |
| 2013/0088625 A1 | 4/2013 | Iwata et al. |
| 2013/0113966 A1 | 5/2013 | Arishima et al. |
| 2013/0162874 A1 | 6/2013 | Hashimoto et al. |
| 2013/0206961 A1 | 8/2013 | Ikeda et al. |
| 2013/0228673 A1 | 9/2013 | Hashimoto et al. |
| 2013/0235253 A1 * | 9/2013 | Onuki ................ H04N 5/23212 348/349 |
| 2013/0271633 A1 | 10/2013 | Hashimoto et al. |
| 2014/0028877 A1 * | 1/2014 | Jang ....................... H04N 5/225 348/231.99 |
| 2014/0036121 A1 | 2/2014 | Minowa et al. |
| 2014/0312207 A1 | 10/2014 | Ikeda et al. |
| 2014/0320717 A1 | 10/2014 | Hiyama et al. |
| 2014/0375861 A1 * | 12/2014 | Jang ..................... H04N 5/2353 348/333.01 |
| 2015/0009383 A1 | 1/2015 | Fujii et al. |
| 2015/0256778 A1 * | 9/2015 | Kusaka .................. G03B 13/36 348/302 |

FOREIGN PATENT DOCUMENTS

| | | |
|---|---|---|
| JP | 2013-090160 | 5/2013 |
| JP | 2013090160 A | 5/2013 |
| KR | 10-2012-0062383 | 6/2012 |
| WO | 2014118868 A1 | 8/2014 |

* cited by examiner

IMAGING APPARATUS, IMAGING SYSTEM, AND METHOD FOR DRIVING IMAGING APPARATUS

BACKGROUND OF THE INVENTION

Field of the Invention

The present invention relates to an imaging apparatus, an imaging system, and a method for driving the imaging apparatus.

Description of the Related Art

An imaging apparatus is known which has a plurality of pixels containing a plurality of photoelectric conversion units arranged under the same microlens, and outputs a signal based on one photoelectric conversion unit and a signal based on another photoelectric conversion unit. This imaging apparatus uses signals of at least two photoelectric conversion units provided under the same microlens, measures a phase difference, detects a focus. Furthermore, the imaging apparatus adds up the signals of the above described two photoelectric conversion units, and thereby obtains an imaging signal. For instance, Japanese Patent Application Laid-Open No. 2013-090160 discloses a technology of adding and reading out signals per pixel unit and solely reading out a signal from each photoelectric conversion unit, in an imaging element in which each pixel has a plurality of photoelectric conversion units and which reads out signals sent from the respective pixels.

However, in Japanese Patent Application Laid-Open No. 2013-090160, a study has not sufficiently been conducted for increasing the speed of reading out an added signal of signals based on the plurality of photoelectric conversion units, and reading out a signal for measuring a phase difference, which is sent from a part of the plurality of photoelectric conversion units.

The technology that will be described below relates to an imaging apparatus, an imaging system and a method for driving the imaging apparatus, which can increase the speed of an operation.

SUMMARY OF THE INVENTION

According to an aspect of the present invention, an imaging apparatus comprises: a plurality of pixels, arranged in a matrix, each including a plurality of photoelectric conversion units generating an electric charge based on an incident light; a controlling unit configured to control each of the plurality of pixels to output a first signal based on an electric charge accumulated in one of the plurality of photoelectric conversion units, and a second signal based on a sum of electric charges accumulated in the plurality of photoelectric conversion units; a combining unit configured to generate a plurality of first combining signals by combining mutually the first signals of the plurality of pixels, and a plurality of second combining signals by combining mutually the second signals of the plurality of pixels; and an output unit configured to output only one or some of the plurality of first combining signals generated by the combining unit.

According to an another aspect of the present invention, an imaging apparatus comprises: a plurality of pixels, arranged in a matrix, each including a plurality of photoelectric conversion units generating an electric charge based on an incident light and a pixel amplifying unit outputting a signal based on the electric charge; a controlling unit configured to control the plurality of pixels to output a plurality of first signals each based on a sum of the electric charge accumulated in ones of the plurality of photoelectric conversion units in the plurality of pixels, and to output a plurality of second signals each based on a sum of the electric charge accumulated in the plurality of photoelectric conversion units in the plurality of pixels; a combining unit configured to generate a plurality of first combining signals by combining mutually the first signals of the plurality of pixels, and a plurality of second combining signals by combining mutually the second signals of the plurality of pixels; and an output unit configured to output only one or some of the plurality of first combining signals generated by the combining unit.

According to a further aspect of the present invention, a driving method of an imaging apparatus having a plurality of pixels, arranged in a matrix, each including a plurality of photoelectric conversion units generating an electric charge based on an incident light, comprises: outputting, by each of the plurality of pixels, a first signal based on an electric charge accumulated in one of the plurality of photoelectric conversion units, and a second signal based on a sum of electric charges accumulated in the plurality of photoelectric conversion units; generating a plurality of first combining signals by combining mutually the first signals of the plurality of pixels, and a plurality of second combining signals by combining mutually the second signals of the plurality of pixels; and outputting only one or some of the plurality of first combining signals generated.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
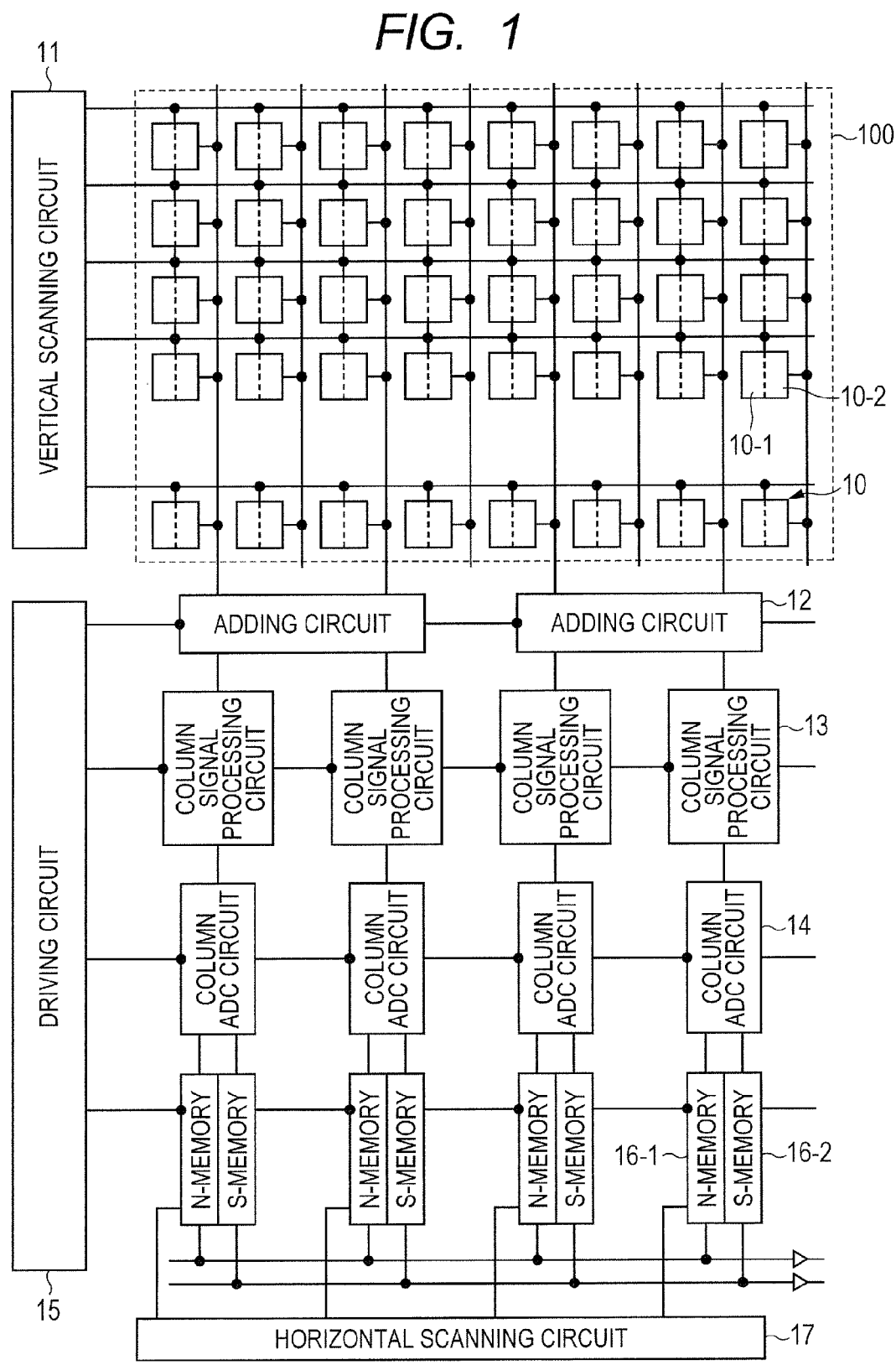
FIG. 1 is a block diagram illustrating a configuration example of an imaging apparatus according to a first embodiment.
Figure 4:
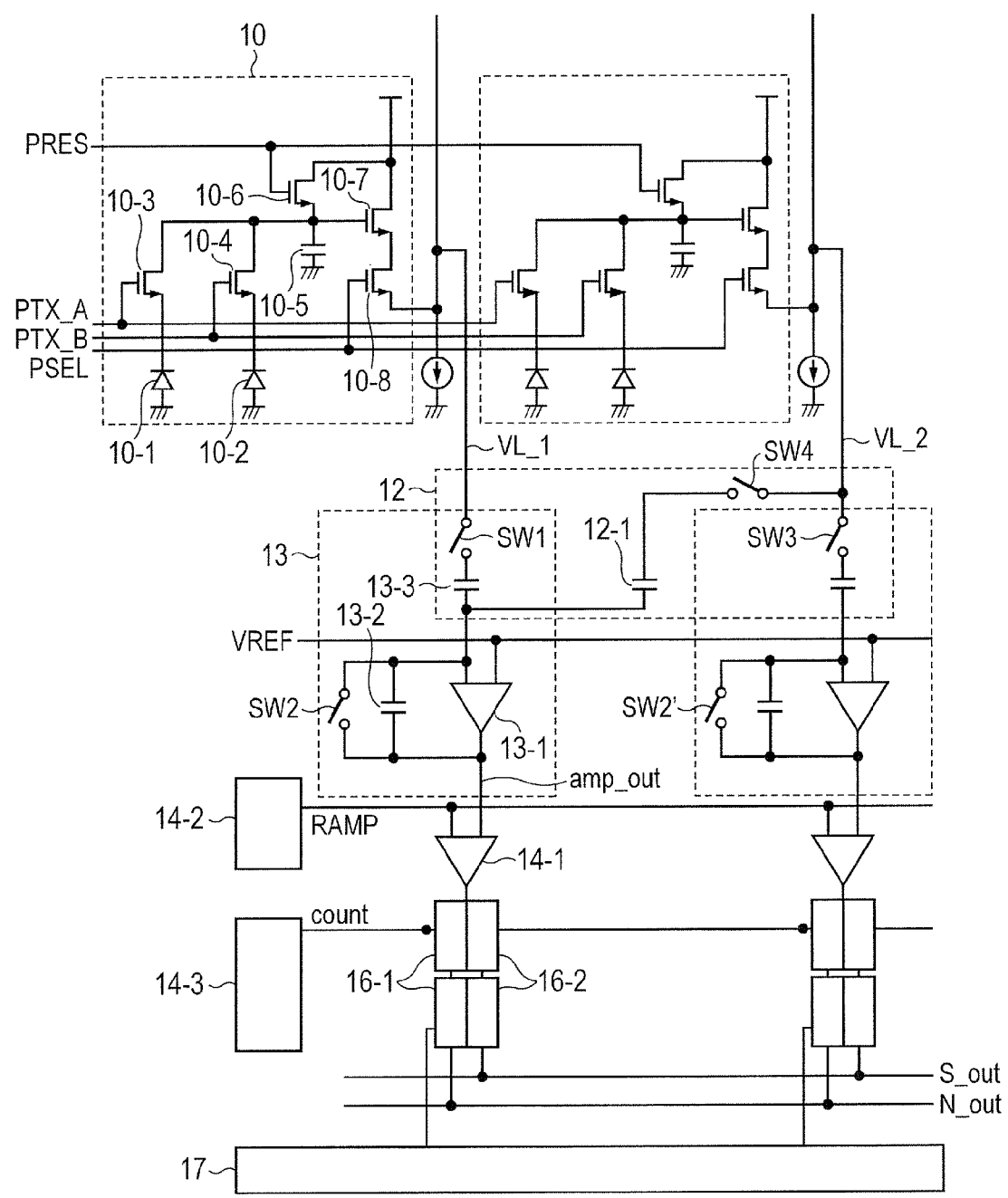
FIG. 4 is a circuit diagram illustrating a configuration example of the imaging apparatus.

FIG. 1 is a block diagram illustrating a configuration example of an imaging apparatus according to a first embodiment of the present invention; and FIG. 4 is a circuit diagram illustrating a configuration example of the imaging apparatus. A pixel unit 100 is an imaging region, and has a plurality of pixels 10 which are arranged in a matrix form. As is illustrated in FIG. 4, each of the plurality of pixels 10 has photoelectric conversion units 10-1 and 10-2, a floating diffusion 10-5, a pixel amplifier (pixel amplifying unit) 10-7, transfer switches 10-3 and 10-4, a reset switch 10-6, and a selecting switch 10-8. The plurality of photoelectric conversion units 10-1 and 10-2 are connected to the same floating diffusion 10-5 through the plurality of transfer switches 10-3 and 10-4, respectively. The first photoelectric conversion unit 10-1 and the second photoelectric conversion unit 10-2 are, for instance, photodiodes, each of which converts incident light into an electric charge (electron) and accumulates the converted electric charge therein. The first transfer switch 10-3 is turned on when a transfer signal PTX_A becomes a high level, and transfers the electric charge of the first photoelectric conversion unit 10-1 to the floating diffusion 10-5. The second transfer switch 10-4 is turned on when a transfer signal PTX_B becomes a high level, and transfers the electric charge of the second photoelectric conversion unit 10-2 to the floating diffusion 10-5. The pixel amplifier 10-7 amplifies the voltage of the floating diffusion 10-5, and outputs the amplified voltage from an output terminal (source terminal). The selecting switch 10-8 is turned on when a selecting signal PSEL becomes a high level, and connects the output terminal of the pixel amplifier 10-7 with a vertical output line VL_1. The pixel 100 in the first column is connected to a common vertical output line VL_1. The pixel 100 in the second column is connected to a common vertical output line VL_2. The reset switch 10-6 is turned on when a reset signal PRES becomes a high level, and resets the photoelectric conversion units 10-1 and 10-2 and the floating diffusion 10-5 to a power source voltage. A vertical scanning circuit 11 supplies the reset signal PRES, the transfer signals PTX_A and PTX_B, and the selecting signal PSEL, to the pixels 100 in a matrix form one row by one row. The pixel 10 outputs a signal according to the voltage of the floating diffusion 10-5.

An adding circuit 12 has a capacitor 12-1 and a switch SW4; and adds signals of the vertical output lines VL_1 and VL_2 of two columns based on a signal of a driving circuit 15 and outputs the added signal, or does not add the signals and outputs the intact signal. A first column signal processing circuit 13 has an amplifier 13-1, a feedback capacitor 13-2, an input capacitor 13-3, a feedback switch SW2 and an input switch SW1. A second column signal processing circuit 13 has switches SW3 and SW2' in place of the switches SW1 and SW2 in the column signal processing circuit 13 of the first column. The column signal processing circuit 13 may be a circuit which simply amplifies a signal, or may also be a circuit which performs correlated double sampling (CDS) that performs differential processing between a pixel signal and a noise signal. In the differential amplifier 13-1, a negative input terminal is connected to the input capacitor 13-3, and a positive input terminal is connected to a node of a reference voltage VREF. The differential amplifier 13-1 outputs a signal obtained by inverting and amplifying a signal which is input into the negative input terminal.

An output signal amp_out of the column signal processing circuit 13 is input into a column ADC circuit (column analog to digital conversion unit) 14. A column ADC circuit 14 converts an analog signal amp_out which is input from the column signal processing circuit 13 into a digital signal, based on a signal sent from a driving circuit 15. The column ADC circuit 14 has a comparator 14-1, a ramp source 14-2 which is common to each column, and a common counter 14-3 that is common to each of the columns. The comparator 14-1 compares the signal amp_out with a ramp signal (reference signal) RAMP of the ramp source 14-2, and outputs an inverted signal when the ramp signal RAMP becomes larger than the signal amp_out. The counter 14-3 counts a count value "count" from the time when the generation of the ramp signal RAMP has been started, until the output signal of the comparator 14-1 is inverted. The count value (digital value) "count" of the counter 14-3 is retained in an N-memory 16-1 or an S-memory 16-2. In the N-memory 16-1, the noise signal is retained which is based on the noise level of the pixel 10. In the S-memory 16-2, the pixel signal is retained which is based on a photoelectrically converted signal that has been generated by the pixel 10. The N-memory 16-1 and the S-memory 16-2 each have a memory for writing information sent from the comparator 14-1 therein, and memories for read-out, which are connected to horizontal read-out lines S_out and N_out, respectively. The signal retained in the memory for writing is transferred to the memory for read-out, and then is horizontally transferred and output to the horizontal read-out lines S_out and N_out, by the scan of a horizontal scanning circuit 17.

Figure 2:
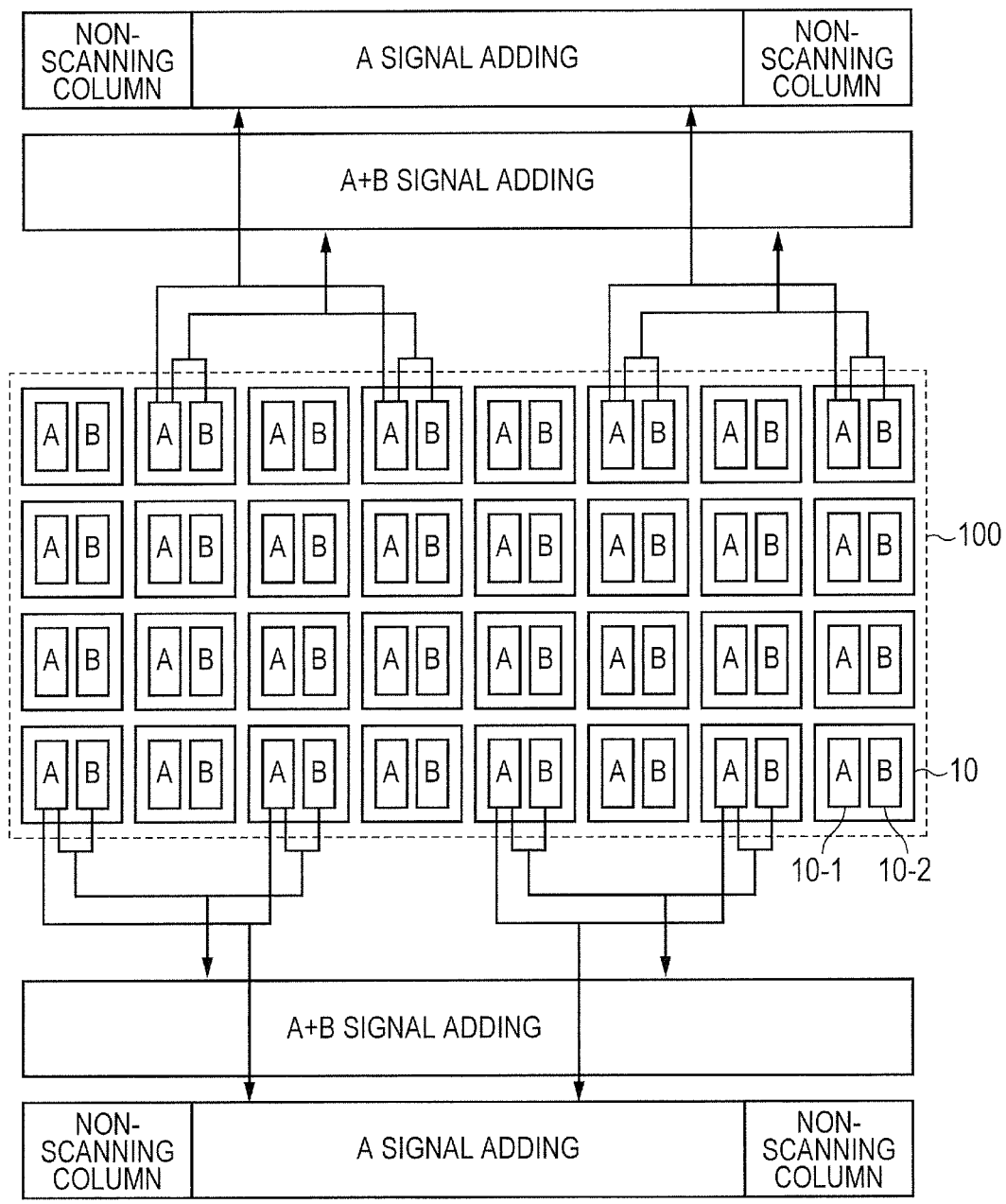
FIG. 2 is a conceptual view of the imaging apparatus according to the first embodiment.

FIG. 2 is a conceptual view of the imaging apparatus. In FIG. 2, the pixel 10 has the two photoelectric conversion units 10-1 and 10-2 which have been divided into two in a horizontal direction under one microlens, and are described as photoelectric conversion units A and B respectively. The photoelectric conversion unit A corresponds to the photoelectric conversion unit 10-1, and the photoelectric conversion unit B corresponds to the photoelectric conversion unit 10-2. The pixel signal of the photoelectric conversion unit A is referred to as an A signal, and the pixel signal of the photoelectric conversion unit B is referred to as a B signal. Furthermore, a signal based on an added signal of photoelectrically converted signals of the two photoelectric conversion units A and B is expressed as an A+B signal. In order to detect a focus, it is necessary to extract the A signal and the B signal, and to measure a phase difference between the signals. In the present embodiment, the A signal and the A+B signal are read out, and the B signal is extracted from a difference between the A+B signal and the A signal, by a not-shown processing circuit. Here, in order to increase the speed at which the signal is read out, the proximate A signals are and proximate A+B signals are added up by the adding circuit 12. The sum of electric charges is obtained which are accumulated in one photoelectric conversion unit in each of the pixels. Specifically, a horizontal scanning period can be shortened, by reducing the number of data to be scanned by the horizontal scanning circuit 17. In FIG. 2, a solid line which connects the photoelectric conversion units A and B to each other shows a combination of signals to be added. The specific method will be described later. In FIG. 2, two A signals are and two A+B signals are added to each other, but the number is not limited to two, but more than two signals may be added to each other. Furthermore, the A signal is necessary for measuring the phase difference, and accordingly is read out only from a region in which the phase difference is detected. Specifically, the A signal is output from a part of columns. Thereby, the number of signals to be read out can be reduced, and the horizontal scanning period of the horizontal scanning circuit 17 can be shortened. The A signal is a first signal which is output by the pixel 10, and the A+B signal is a second signal which is output by the pixel 10.

Figure 3:
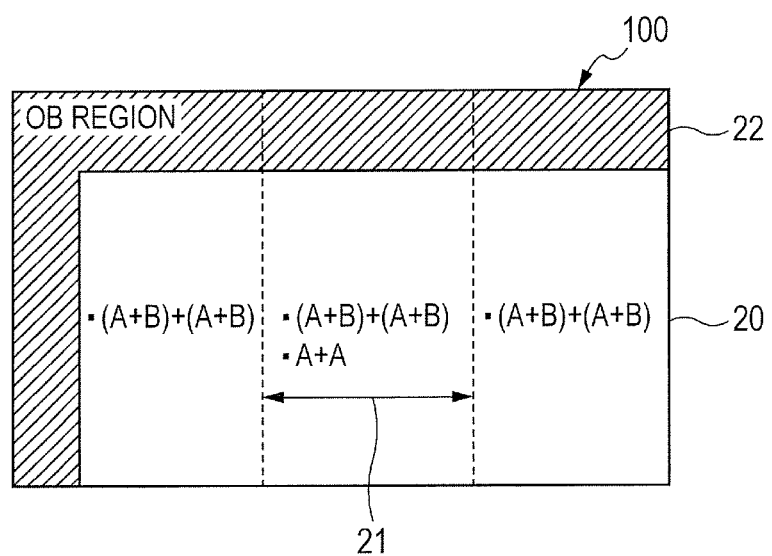
FIG. 3 is a conceptual view of a read-out region.

FIG. 3 is a view illustrating an example of a focus detection region 21 in which a phase difference is measured and a focus is detected, in a pixel unit 100. The pixel unit 100 has an OB region (optical black region) 22 in which the pixel 10 is light-shielded, and an aperture region 20 that can receive incident light. The focus detection region 21 is a region which is sandwiched between the dotted lines, and has pixels in a part of the OB region 22 and pixels in a part of the aperture region 20. An (A+A) signal is read out in the focus detection region 21. The (A+A) signal is a first combined signal obtained by combining the A signals of the two pixels 10 with each other. The (A+A) signal is not read out from another region than the focus detection region 21. The above described imaging signal does not necessarily need to be read out from the whole region of the pixel unit 100 but may be read out from a part of a region containing the OB region 22 and the aperture region 20. In this case, in a region in a part of the pixel unit 100, a focus detection region 21 is provided which is narrower than the region in the part, and the (A+A) signal is read out therefrom. In the whole region of the pixel unit 100, the (A+B)+(A+B) signal is read out as the imaging signal, which is a signal obtained by adding the A+B signals of the two close pixels 10. The (A+A) signal is a second combined signal obtained by combining the A signals of the pixels 10 with each other.

Figure 5:
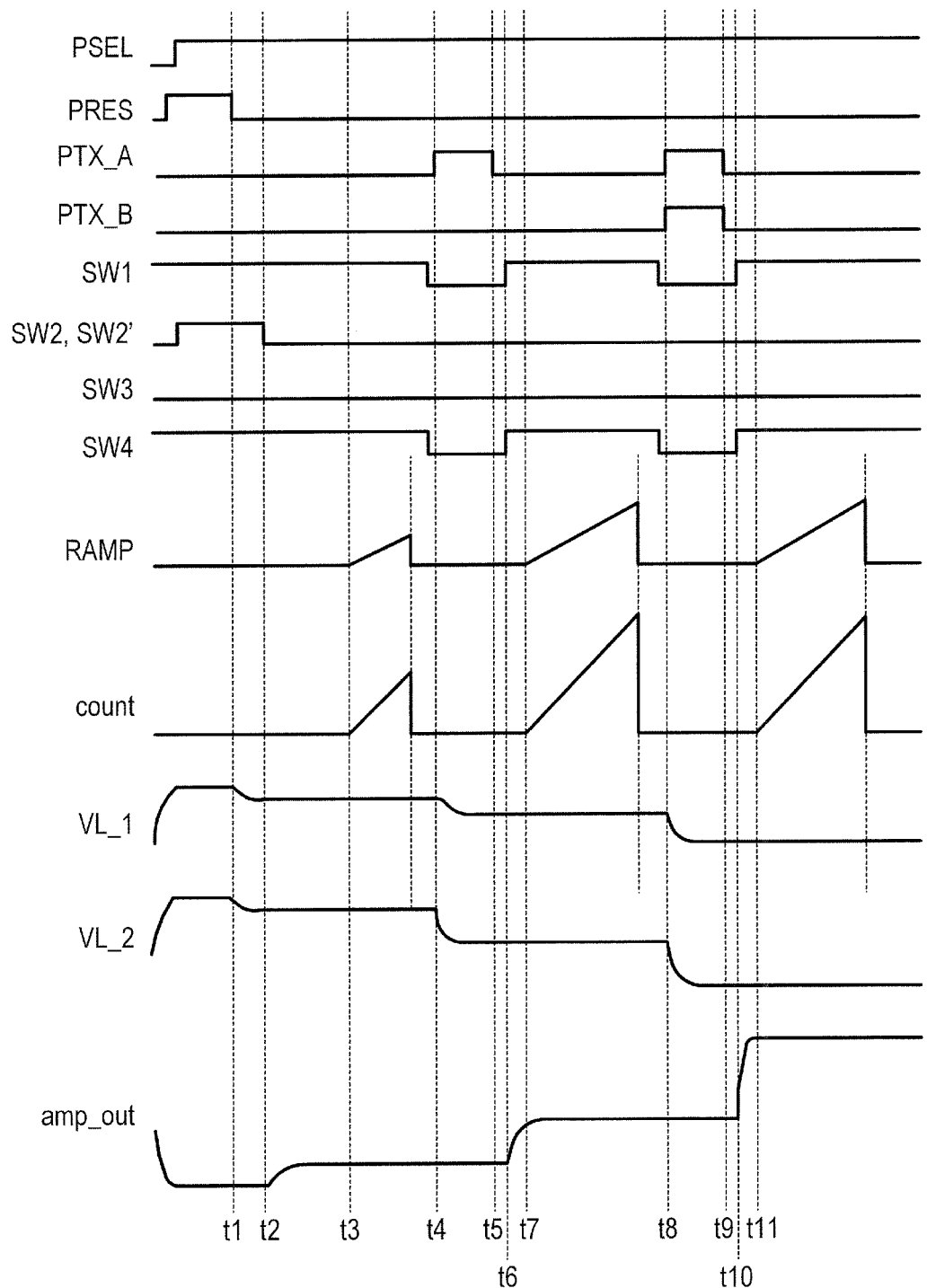
FIG. 5 is a timing chart of the imaging apparatus.

FIG. 5 is a timing chart illustrating a method for driving the imaging apparatus. A timing example will be described below in the case where the two pixels 10 provided in the vicinity in the horizontal direction are added by the adding circuit 12. In the present embodiment, in order to add the signals of the two pixels 10, the switch SW4 shall be turned on, and the switch SW3 shall be turned off. When the signals of the two pixels 10 are not added and the signal of each of the pixels 10 is read out, the switch SW4 shall be turned off, and the switch SW3 shall be turned on.

Firstly, the selecting signal PSEL becomes a high level, the selecting switch 10-8 is turned on, and the row of the pixel 10 to be output is selected. In addition, the reset signal PRES is set at a high level, and thereby the floating diffusion 10-5 is reset to a power source potential. At this time, the switches SW2 and SW2' shall be also turned on, and the amplifier 13-1 shall be set at a reset state.

At the time t1, the reset signal PRES transitions to a low level, and the reset switch 10-6 is turned off. Then, the noise signals of the pixels 10 in the reset state are output to the vertical output lines VL_1 and VL_2. At this time, both of the switch SW1 and switch SW4 are turned on, and accordingly two signals which are the signal of the vertical output line VL_1 and the signal of the vertical output line VL_2 are added through the capacitors 13-3 and 12-1, respectively.

At the time t2, the switches SW2 and SW2' are turned off, and thereby the column signal processing circuit 13 retains a signal obtained by adding the noise signals of the two pixels 10 in the reset state, and outputs the signal amp_out to the column ADC circuit 14.

At the time t3, the ramp source 14-2 starts the generation of the ramp signal RAMP, and the counter 14-3 starts the count-up of the count value "count". When the ramp signal RAMP becomes larger than the signal amp_out, the comparator 14-1 inverts the output signal. At the timing, the count value "count" of the counter 14-3 is written in the N-memory 16-1. The digital signal based on the signal obtained by adding the signals of the two pixels 10 in the reset state is retained in the N-memory 16-1. After that, the switches SW1 and SW4 are turned off. The counter 14-3 resets the ramp signal RAMP to an initial value, and resets the count value "count".

Next, at the time t4, the transfer signal PTX_A is set at a high level, and the transfer switch 10-3 is turned on. The electric charge which has been accumulated in the photoelectric conversion unit 10-1 is transferred to the floating diffusion 10-5. At the time t5, the PTX_A is set at a low level, and the transfer switch 10-3 is turned off. The A signals based on the amounts of the electric charges which have been accumulated in the photoelectric conversion units 10-1 in the two pixels 10 are output to the vertical output lines VL_1 and VL_2, respectively.

At the time t6, the switches SW1 and SW4 are turned on. The A signals of the vertical output lines VL_1 and VL_2 are added by the adding circuit 12 and the column signal processing circuit 13, and the (A+A) signal is generated. The generated (A+A) signal is input into the column ADC circuit 14.

At the time t7, the ramp source 14-2 starts the generation of the ramp signal RAMP, and the counter 14-3 starts the count-up of the count value "count". When the ramp signal RAMP becomes larger than the signal amp_out, the comparator 14-1 inverts the output signal. At the timing, the count value "count" of the counter 14-3 is written in the S-memory 16-2. The digital signal based on the (A+A) signal is retained in the S-memory 16-2. The digital signals in the S-memories 16-2 in each of the columns are sequentially horizontally transferred to the horizontal read-out line S_out, and the digital signals in the N-memories 16-1 in each of the columns are sequentially horizontally transferred to the horizontal read-out line N_out. After that, the switches SW1 and SW4 are turned off.

At the time t8, the transfer signals PTX_A and PTX_B are simultaneously set at a high level, and the transfer switches 10-3 and 10-4 are turned on. At this time, an electric charge obtained by adding an electric charge which has been accumulated in the photoelectric conversion unit 10-1 to an electric charge which has been accumulated in the photoelectric conversion unit 10-2 is retained in the floating diffusion 10-5.

At the time t9, the transfer signals PTX_A and PTX_B are simultaneously set at a low level, and the transfer switches 10-3 and 10-4 are turned off. Signals based on the A+B signals obtained by adding the photoelectrically converted signals of the two photoelectric conversion units 10-1 and 10-2 on the floating diffusions 10-5 are output to the vertical output lines VL_1 and VL_2, respectively.

At the time t10, the switches SW1 and SW4 are turned on. The two A+B signals of the vertical output lines VL_1 and VL_2 are added by the adding circuit 12 and the column signal processing circuit 13, and the (A+B)+(A+B) signal is generated. The generated (A+B)+(A+B) signal is input into the column ADC circuit 14.

At the time t11, the ramp source 14-2 starts the generation of the ramp signal RAMP, and the counter 14-3 starts the count-up of the count value "count". When the ramp signal RAMP becomes larger than the signal amp_out, the comparator 14-1 inverts the output signal. At the timing, the count value "count" of the counter 14-3 is written in the S-memory 16-2. The digital signal based on the (A+B)+(A+B) signal is retained in the S-memory 16-1. The digital signals in the S-memories 16-2 in each of the columns are sequentially horizontally transferred to the horizontal read-out line S_out, and the digital signals in the N-memories 16-1 in each of the columns are sequentially horizontally transferred to the horizontal read-out line N_out.

The operations in between the times t4 and t8, which have been described above, are operations of a first mode. In between the times t4 and t5, the vertical scanning circuit (controlling unit) 11 makes the plurality of pixels 10 output the A signal, in the state in which one photoelectric conversion unit 10-1 out of the plurality of photoelectric conversion units 10-1 and 10-2 is connected to the floating diffusion 10-5. In between the times t6 and t8, the adding circuit (combining unit) 12 adds (combines) the output signals in every pixel 10 in a plurality of columns in the same row, and outputs the (A+A) signal. Specifically, the adding circuit 12 connects the output lines VL_1 and VL_2 of the pixels 10 in the plurality of columns to the same node through the capacitors 13-3 and 12-1 respectively, and thereby adds (combines) the signals. After that, in a period p1 in FIG. 6, the horizontal scanning circuit (output unit) 17 selects and outputs a part (signal based on focus detection region 21) of the (A+A) signals which have been added by the adding circuit 12.

Operations after the time t8 are operations of a second mode. In between the times t8 and t9, the vertical scanning circuit (controlling unit) 11 makes the plurality of pixels 10 output the A+B signal, in the state in which the plurality of photoelectric conversion units 10-1 and 10-2 are connected to the floating diffusion 10-5. After the time t10, the adding circuit (combining unit) 12 adds (combines) the output signals in every pixel 10 in a plurality of columns in the same row, and outputs the (A+B)+(A+B) signal. After that, in a period p2 in FIG. 6, the horizontal scanning circuit (output unit) 17 outputs the (A+B)+(A+B) signals (signals of whole region in pixel unit 100) which have been added by the adding circuit 12.

The feature of the present embodiment exists in a point that the (A+A) signal is generated by adding the A signals which have been read out from the pixels 10 in the plurality of columns to each other, and that the (A+B)+(A+B) signal is generated by adding the A+B signals which have been read out from the pixels 10 in the plurality of columns to each other. In addition, the feature of the present embodiment exists in a point that added signals of the A signals in the whole region of the pixel unit 100 are not output but added signals of the A signals only in the focus detection region 21 are output.

In the present embodiment, a procedure for obtaining the A+B signal is not limited to the adding operation to be carried out on the floating diffusion 10-5. For information, the S-memory 16-2 may have individual memories for the A signal and the A+B signal, or may use a common memory in a time-division fashion.

Figure 6:
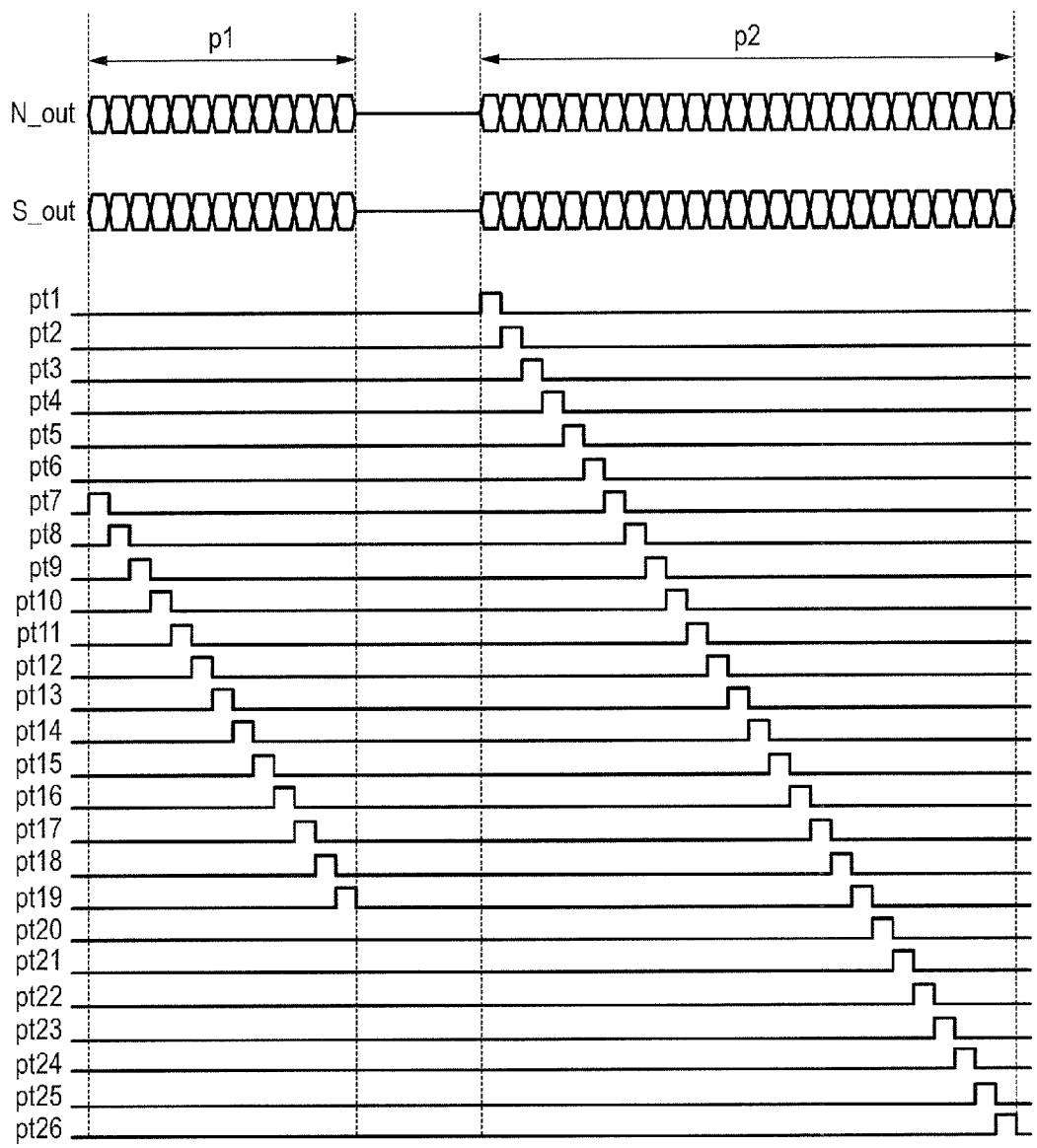
FIG. 6 is a timing chart illustrating horizontal read-out.

FIG. 6 is a timing chart of the horizontal transfer read-out of the horizontal scanning circuit 17. The horizontal read-out lines N_out and S_out show each 1 bit of the digital data. The transfer pulses pt1 to pt26 are pulses which are input to the N-memory 16-1 and the S-memory 16-2 in each of the columns from the horizontal scanning circuit 17. The subscript of a pulse name pt designates the number of the column. The transfer pulses pt7 to pt19 show a horizontal zone of the focus detection region 21 which is sandwiched between the dotted lines in FIG. 3.

In the period p1, the digital value of the A+A signal is retained in the S-memory 16-2. In the period p2, the digital value of the (A+B)+(A+B) signal is retained in the S-memory 16-2. The period p1 is a period in which the A+A signal is output. In the period p1, the horizontal scanning circuit 17 scans only the columns corresponding to the focus detection region 21, and accordingly sequentially scans the transfer pulses pt7 to pt19 of the corresponding columns. Thereby, the digital values of the A+A signals only in the focus detection region 21 are sequentially output, and accordingly the read-out speed becomes fast.

The period p2 is a period in which the digital value of the (A+B)+(A+B) signal is output. In the period p2, in order to scan all the columns in the pixel unit 100, the horizontal scanning circuit 12 sequentially scans the transfer pulses pt1 to pt26 of the corresponding columns. Thereby, the digital values of the (A+B)+(A+B) signals in the whole region in the pixel unit 100 are sequentially output.

The digital values of the (A+A) signals and the digital values of the (A+B)+(A+B) signals can be retained in the common S-memory 16-2 in a time-division fashion. In the present embodiment, the A signals in the plurality of columns are added thereby to generate the (A+A) signals, and the (A+B) signals in the plurality of columns are added thereby to generate the (A+B)+(A+B) signals. When the (A+A) signal is generated, the A signal only in the pixel 10 in the focus detection region 21 is read out, thereby the number of the data to be read out is reduced, and the read-out speed can be increased. In the present embodiment, such a method has been described above that an analog signal in every column is converted into a digital signal and the digital signal is read out, but the method may be a form of outputting the analog signal without converting the analog signal to the digital signal.

The imaging apparatus according to the present embodiment shows an effect capable of reading out a signal having a high S/N in a short period of time, by combining the following operations (1) to (3).

(1) The imaging apparatus reads out a signal for detecting a focus (detecting phase difference) from the pixel 10 as the A signal, and reads out the imaging signal as the A+B signal.

(2) The imaging apparatus reads out the A signal in addition to the A+B signal in the pixel in the focus detection region 21 in which the focus is detected, and does not read out the A signal in the pixel in a region (region other than focus detection region 21) in which the focus is not detected.

(3) The imaging apparatus adds the A signals of the pixels 10 in the plurality of columns to each other, and adds the A+B signals of the pixels 10 in the plurality of columns to each other.

By the operation (2), the imaging apparatus can reduce the amount of the data, and can increase the read-out speed. A signal of the A signal is small compared to that of the A+B signal, and the B signal which is obtained by subtracting the A signal from the A+B signal has a further degraded S/N. Accordingly, those signals become the factor of degrading a focus detection accuracy, when the illuminance is low. The imaging apparatus according to the present embodiment enhances the S/N of the A signal by adding the A signals in the plurality of columns, and can enhance the focus detection accuracy when the illuminance is low. In addition, the imaging apparatus can obtain an imaging signal having a high S/N ratio by adding the A+B signals in the plurality of columns.

For information, the position of the focus detection region 21 may be differentiated according to each frame.

Second Embodiment

Figure 7:
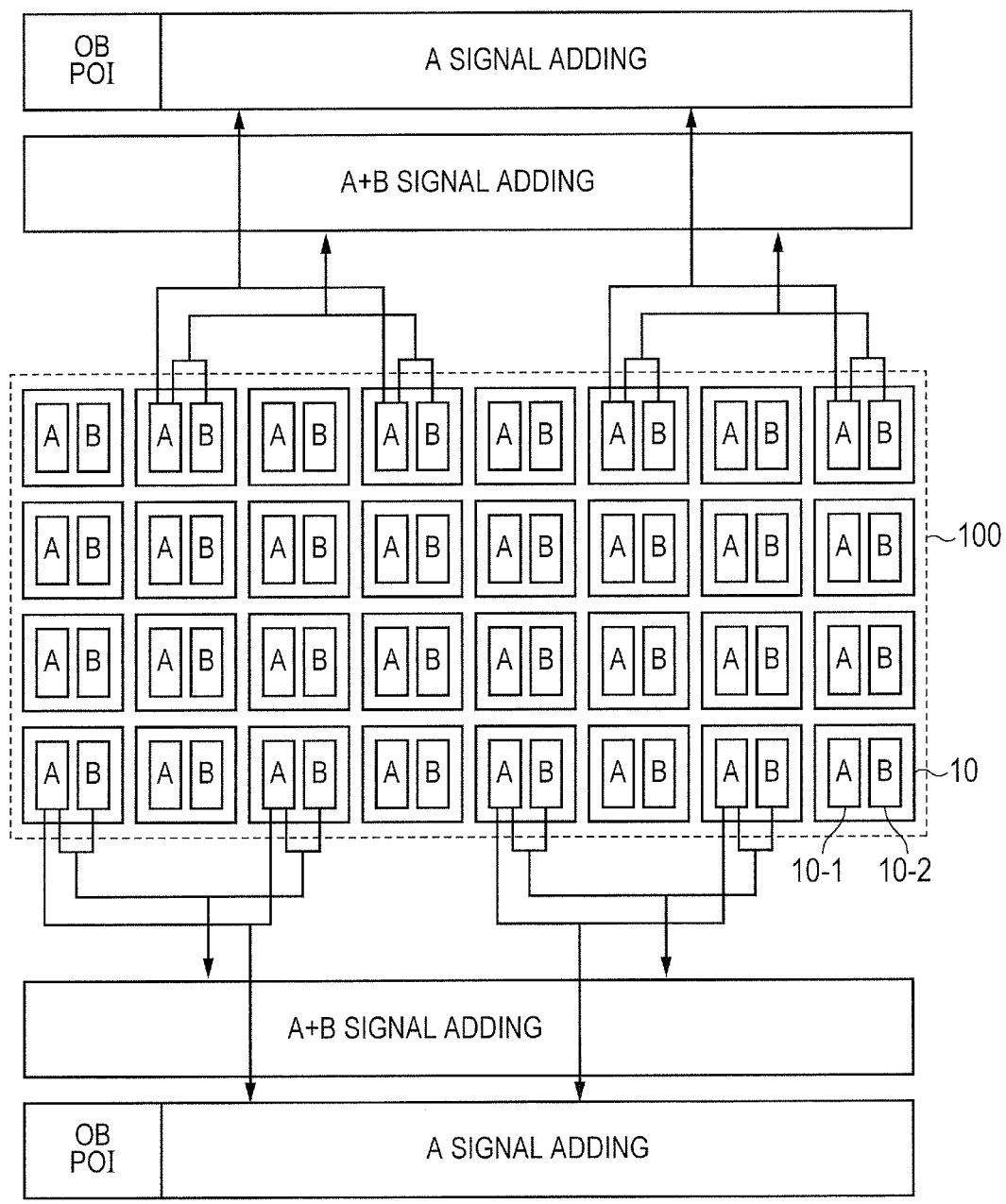
FIG. 7 is a conceptual view of an imaging apparatus according to a second embodiment.
Figure 8:
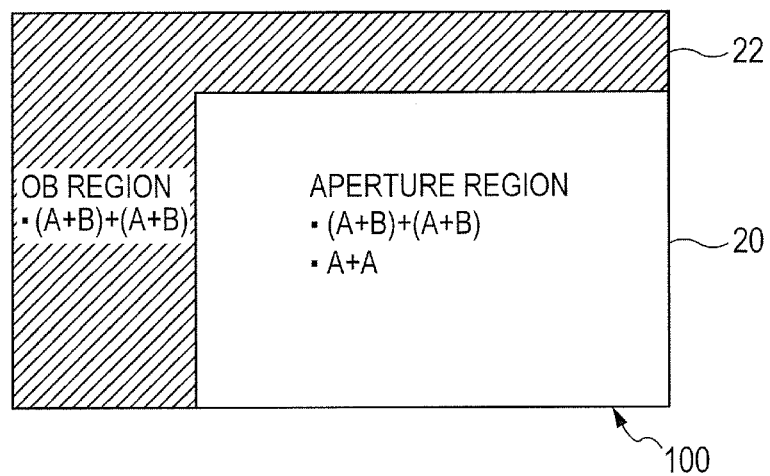
FIG. 8 is a conceptual view of a read-out region.

FIG. 7 is a conceptual view of an imaging apparatus according to a second embodiment of the present invention, which corresponds to FIG. 2. FIG. 8 is a view illustrating an example of a focus detection region 21 in a pixel unit 100, similarly to FIG. 3. An imaging apparatus according to the present embodiment has the same configuration and driving timing as those in that of the first embodiment, and has a different focus detection region from that in the first embodiment. In the present embodiment, a focus detection region in which the focus is detected is the aperture region 20, and a region in which the focus is not detected is the OB region 22.

The (A+B)+(A+B) signals are generated based on the pixels in the whole region of the pixel unit 100. The A+A signal is generated only based on the pixels in the aperture region 20, and is not generated in the OB region 22. In the OB region 22, the (A+B)+(A+B) signal is generated which is obtained by adding the A+B signals in the plurality of columns. In the aperture region 20, the (A+B)+(A+B) signal which is obtained by adding the A+B signals in the plurality of columns, and the (A+A) signal that is obtained by adding the A signals in the plurality of columns, are generated. The A+A signal is not read out in the OB region in which the focus is not detected, accordingly the amount of the data is reduced and the data can be read out at high speed.

In addition, the imaging apparatuses according to the first and second embodiments combine the signals which have been output from the respective pixel amplifiers 10-7 in the pixels 10 to each other and generate the (A+A) signal and the (A+B)+(A+B) signal. As another example, the pixel amplifier 10-7 may combine the electric charges of the floating diffusions 10-5 in the plurality of pixels 10 with each other, and output each of the (A+A) signal and the (A+B)+(A+B) signal.

Third Embodiment

Figure 9:
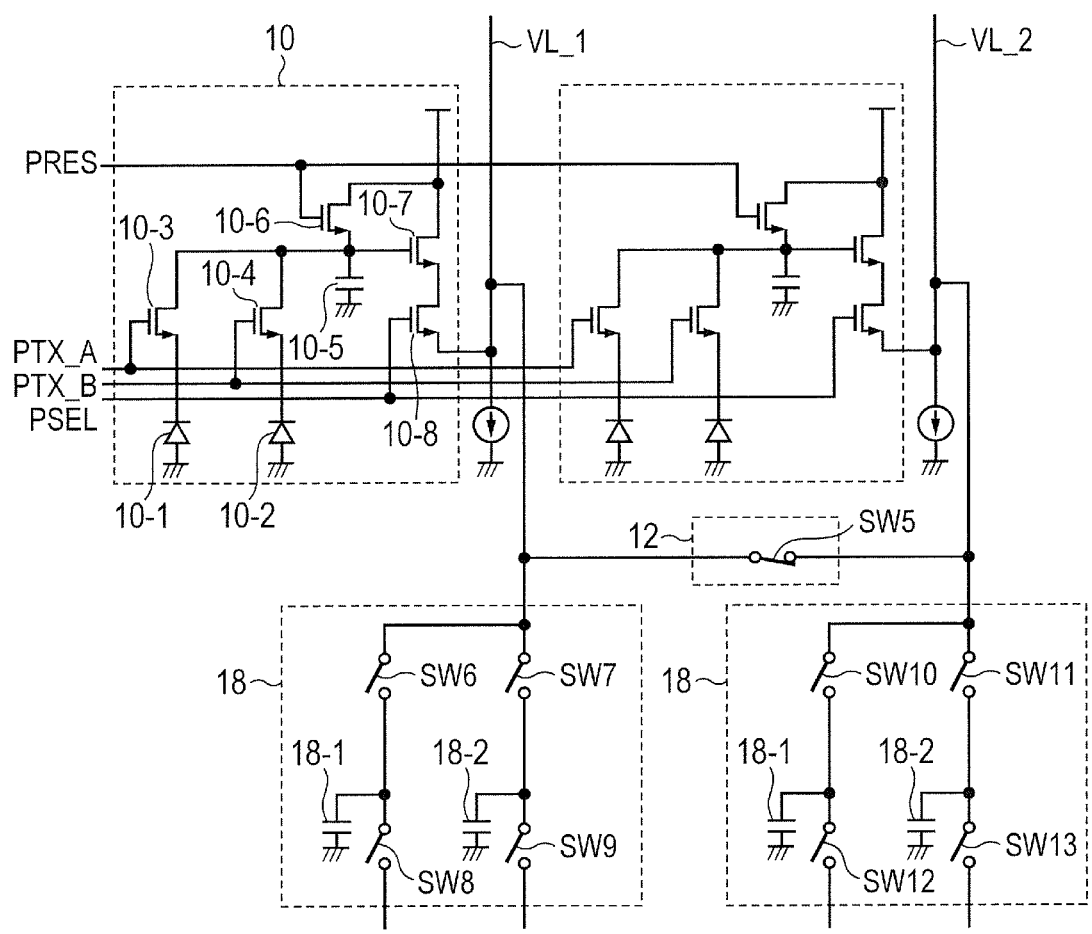
FIG. 9 is a circuit illustrating a configuration example of an imaging apparatus according to a third embodiment.

FIG. 9 is a view illustrating a configuration example of a part of an imaging apparatus according to a third embodiment of the present invention, similarly to FIG. 4. The present embodiment is different from the first embodiment in a method for combined signals of the pixels in the plurality of columns. The imaging apparatus according to the present embodiment averages the signals in a capacitor, as a method for combining the signals of the pixels in the plurality of columns. The point will be described below in which the present embodiment is different from the first embodiment. A first signal holding circuit 18 is connected to the vertical output line VL_1, and has capacitors 18-1 and 18-2, and switches SW6 to SW9. A second signal holding circuit 18 is connected to the vertical output line VL_2, and has capacitors 18-1 and 18-2, and switches SW10 to SW13. The adding circuit 12 has a switch SW5. When the switch SW5 is turned on, the signal of the vertical output line VL1 and the signal of the vertical output line VL2 are averaged (combined). The output terminals of the signal holding circuits 18 are connected to the column signal processing circuit 13 in FIG. 4. For information, the switches SW8 and SW12 may be each connected to the comparator 14-1 or to the N-memory 16-1 in FIG. 4. Similarly, the switches SW9 and SW13 may be each connected to the comparator 14-1 or to the S-memory 16-2 in FIG. 4.

Figure 10:
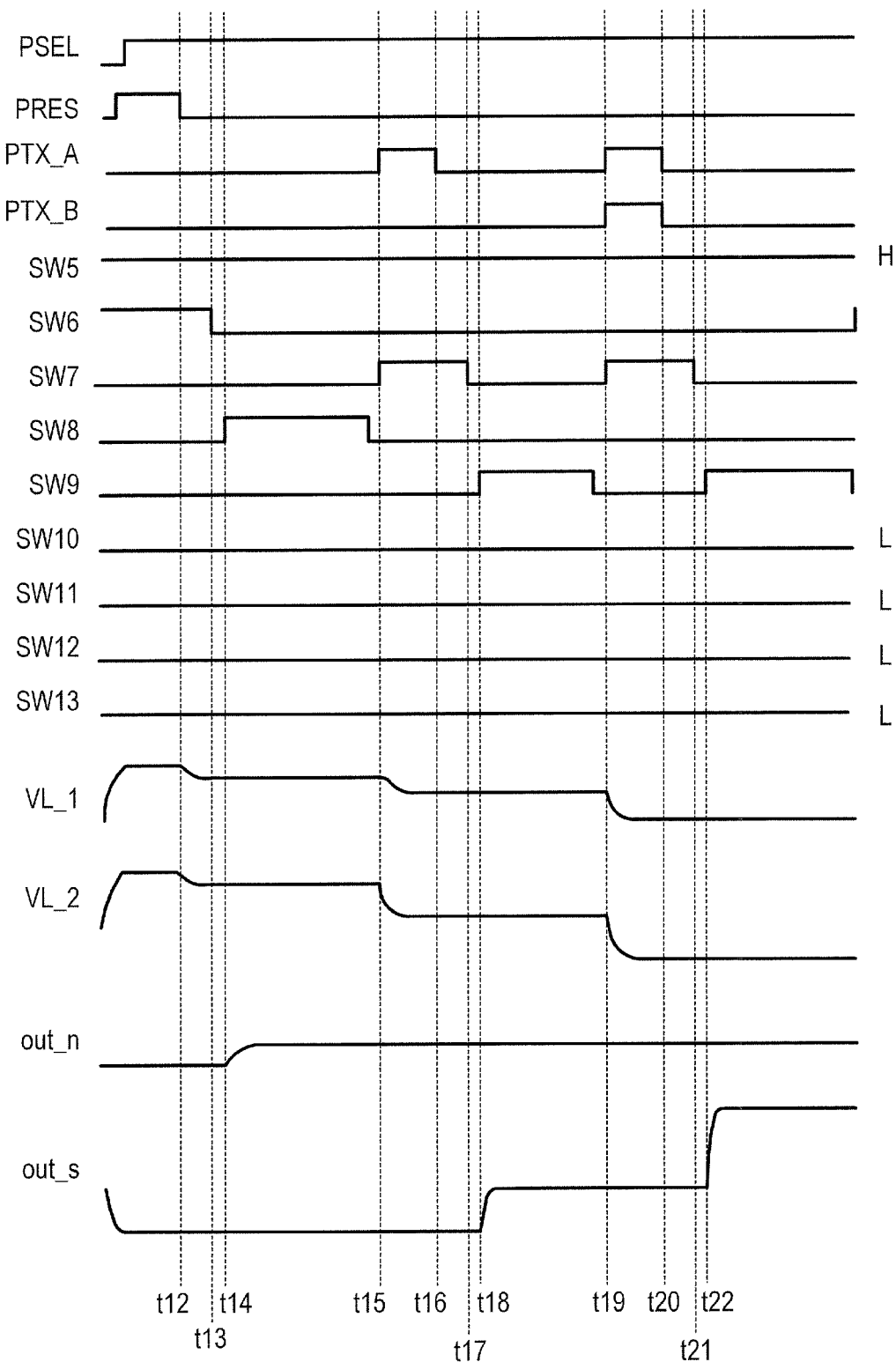
FIG. 10 is a timing chart of the imaging apparatus.

FIG. 10 is a timing chart illustrating a method for driving an imaging apparatus of FIG. 9. An example will be described below in which signals of two pixels 10 are averaged (combined). In order to average (combine) the signals of the two pixels 10, the switch SW5 is turned on, and the switches SW10 and SW11 are turned off. A signal out_n corresponds to an output signal amp_out of the column signal processing circuit 13 which is connected to the switch SW8. A signal out_s corresponds to the output signal amp_out of the column signal processing circuit 13 which is connected to the switch SW9.

Firstly, the selecting signal PSEL becomes a high level, then the selecting switch 10-8 is turned on, and the row of a pixel 10 is selected. In addition, when the reset signal PRES is set at a high level, the reset switch 10-6 is turned on, and the floating diffusion 10-5 is reset to a power source voltage.

At the time t12, the reset signal PRES is transited to a low level, then the reset switch 10-6 is turned off, and signals of the pixels 10 based on the reset state are output to the vertical output lines VL_1 and VL_2. At this time, the switches SW6 and SW5 are turned on, and accordingly the vertical output lines VL_1 and VL_2 are connected to each other. At this time, the approximately average value of the voltages of the vertical output lines VL_1 and VL_2 based on the effective resistance value of the transistors 10-7 and 10-8 is accumulated in a capacitor 18-1. When the voltage values of the vertical output lines VL_1 and VL_2 are close to each other, this average value which is extremely close to a true average value is accumulated in the capacitor 18-1. When the voltage values of the vertical output lines VL_1 and VL_2 are distant from each other, a value obtained by weighting the voltages of the vertical output lines VL_1 and VL_2 with the high voltage is accumulated in the capacitor 18-1. When the pixels 10 are in the reset state, the voltages of the vertical output lines VL_1 and VL_2 are generally close values to each other.

At the time t13, the switch SW6 is turned off, and the electric charge is retained in the capacitor 18-1. At the time t14 immediately after the time t13, the switch SW8 is turned on, and the signal retained in the capacitor 18-1 is output. After that, the switch SW8 is turned off.

At the time t15, the transfer signal PTX_A is set at a high level, and the transfer switch 10-3 is turned on. The electric charge which has been accumulated in the photoelectric conversion unit 10-1 is transferred to the floating diffusion 10-5. At the time t16, the transfer signal PTX_A is set at a low level, then the transfer switch 10-3 is turned off, and the above described transfer is ended. In addition, a switch SW7 is turned on, and thereby an (A+A)/2 signal which is an approximately average value of the voltages of the vertical output lines VL_1 and VL_2 is retained in a capacitor 18-2. At the time t18, the switch SW9 is turned on, and the signal retained in the capacitor 18-2 is output.

At the time t19, the transfer signals PTX_A and PTX_B are simultaneously set at a high level, and the transfer switches 10-3 and 10-4 are turned on. At this time, an electric charge obtained by adding the electric charge which has been accumulated in the photoelectric conversion unit 10-1 and the electric charge which has been accumulated in the photoelectric conversion unit 10-2 results in being retained in the floating diffusion 10-5. To the vertical output lines VL_1 and VL_2, each of the A+B signals is output which has been obtained by adding the photoelectrically converted signals of the two photoelectric conversion units 10-1 and 10-2 on the floating diffusion 10-5. In addition, when the switch SW7 is turned on, a signal obtained by averaging the voltages of the vertical output lines VL_1 and VL_2, specifically, an [(A+B)+(A+B)]/2 signal is written in the capacitor 18-2.

At the time t20, the transfer signals PTX_A and PTX_B are set at a low level, then the transfer switches 10-3 and 10-4 are turned off, and the above described transfer is ended. At the time t21, the switch SW7 is turned off, and the capacitor 18-2 retains the signal [(A+B)+(A+B)]/2. At the time t22, the switch SW9 is turned on, and the signal retained in the capacitor 18-2 is output.

The operations in between the times t15 and t19, which have been described above, are operations of the first mode. In between the times t15 and t16, the vertical scanning circuit (controlling unit) 11 makes the plurality of pixels 10 output the A signal in the state in which one photoelectric conversion unit 10-1 out of the plurality of photoelectric conversion units 10-1 and 10-2 is connected to the floating diffusion 10-5. The adding circuit (combining unit) 12 averages (combines) the output signals in every pixel 10 in the plurality of columns in the same row, and outputs an (A+A)/2 signal. Specifically, the adding circuit 12 connects the output lines VL_1 and VL_2 of the pixels in the plurality of columns to each other, and thereby averages (combines) the signals. After that, in the period p1 in FIG. 6, the horizontal scanning circuit (output unit) 17 selects a part of the (A+A)/2 signals (signals based on focus detection region 21) which have been averaged by the adding circuit 12, and outputs the signal.

Operations after the time t19 are the operations of the second mode. In between the times between t19 and t20, the vertical scanning circuit (controlling unit) 11 makes the plurality of pixels 10 output the A+B signal in the state in which the plurality of photoelectric conversion units 10-1 and 10-2 are connected to the floating diffusion 10-5. After the time t20, the adding circuit (combining unit) 12 averages (combines) the output signals in every pixel 10 in the plurality of columns in the same row, and outputs the [(A+B)+(A+B)]/2 signal. After that, in a period p2 in FIG. 6, the horizontal scanning circuit (output unit) 17 outputs the [(A+B)+(A+B)]/2 signals (signals of whole region in pixel unit 100) which have been averaged by the adding circuit 12.

Thereby, an averaging process of the A signals in the plurality of columns and the averaging process of the A+B signals in the plurality of columns are performed. The imaging apparatus according to the present embodiment generates the average value of the A signals only in the focus detection region 21, similarly to the first embodiment, thereby reduces the number of the data to be read out, and can read out the data at high speed. In addition, the imaging apparatus according to the present embodiment can obtain an effect of reducing the number of data, by the averaging process. In addition, the imaging apparatus according to the present embodiment can carry out the adding or averaging process without arranging an active circuit for the adding or averaging process. The averaging process in the present embodiment has been performed by connecting the vertical output lines VL_1 and VL_2, but may also be performed by reading out the signals to the capacitors for the vertical output line VL_1 and the capacitors for the vertical output line VL_2 respectively, and short-circuiting each pair of capacitors. The adding circuit 12 in FIG. 9 has an effect of reducing a time period in which each pair of capacitors are short-circuited, reducing the number of the capacitors necessary for the averaging process, and assigning the reduced capacitors to another process, compared to the above described case where each pair of capacitors are short-circuited.

In addition, in the first to third embodiments, the A signals of the pixels 10 in the same row have been combined with each other and the A+B signals similarly have been combined with each other. As another example, it is also acceptable to combine the A signals of the pixels 10 in a plurality of rows with each other and the A+B signals similarly with each other. When the above described A signals and A+B signals of the pixels 10 in the plurality of rows are combined with each other, it is acceptable that the vertical scanning circuit 11 simultaneously selects the pixels 10 in the plurality of rows, and the pixels 10 in the plurality of rows are simultaneously output to the vertical output line VL_1.

Fourth Embodiment

Figure 11:
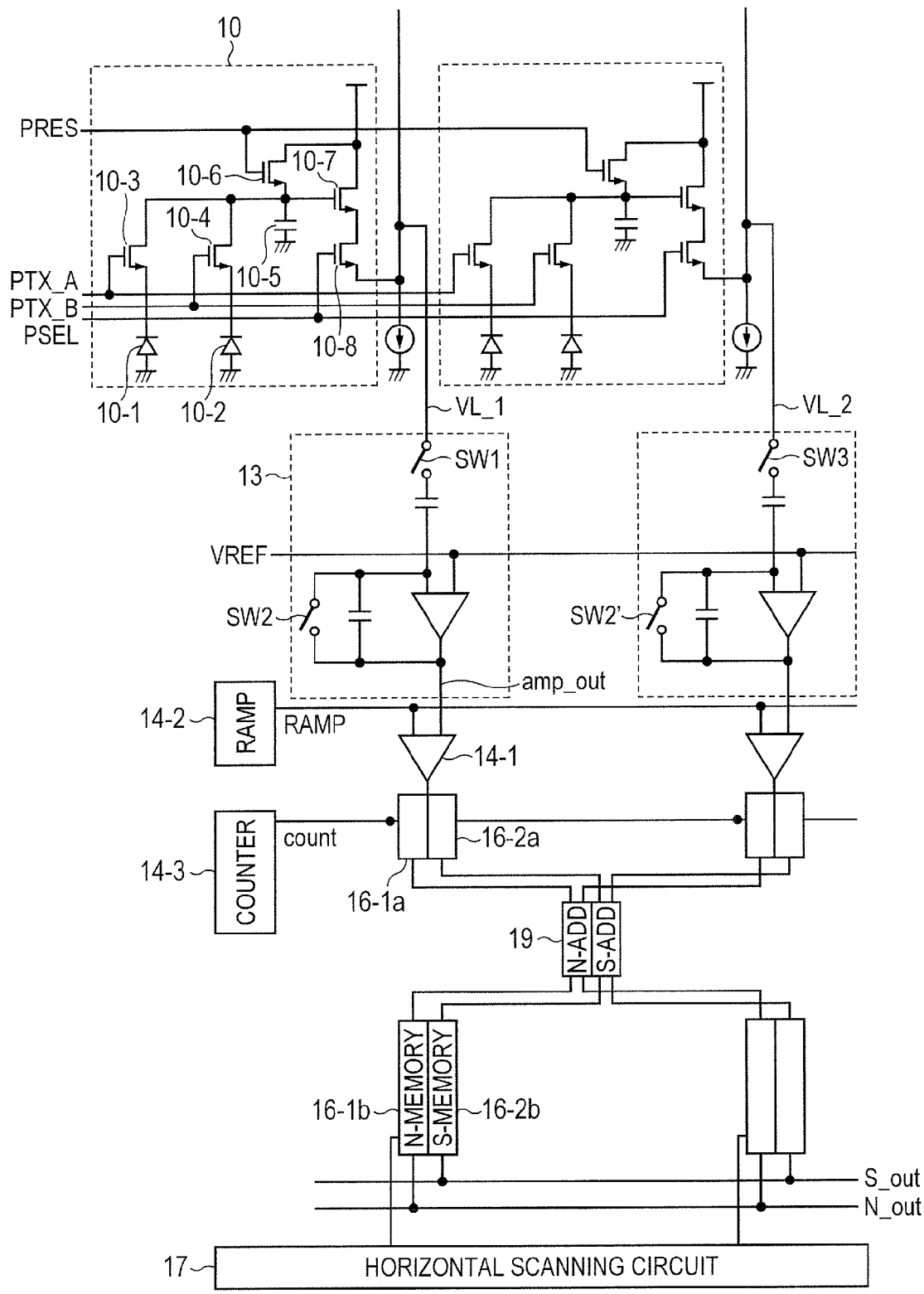
FIG. 11 is a circuit diagram illustrating a configuration example of an imaging apparatus according to a fourth embodiment.

FIG. 11 is a view illustrating a configuration example of an imaging apparatus according to a fourth embodiment of the present invention. In the present embodiment, digital data in the plurality of columns is added. The point will be described below in which the present embodiment is different from the first embodiment. The present embodiment is different from the first embodiment in the point that digital data after an analog signal has been converted to a digital signal is added to each other. FIG. 11 is a view of an imaging apparatus in which the capacitor 12-1 and the switch SW4 are deleted from, and an adding circuit 19 is added to the imaging apparatus in FIG. 4. A memory 16-1a for writing and a memory 16-1b for read-out correspond to an N-memory 16-1 in FIG. 4. A memory 16-2a for writing and a memory 16-2b for read-out correspond to an S-memory 16-2 in FIG. 4. The adding circuit (combining unit) 19 adds (combines) digital data of the memories 16-1a for writing in the plurality of columns, and writes the added digital data in the memory 16-1b for read-out. In addition, the adding circuit (combining unit) 19 adds (combines) digital data of the memories 16-2a for writing in the plurality of columns, and writes the added digital data in the memory 16-2b for read-out. When the A signals have been read out from the pixels 10, the A+A signal obtained by adding the A signals in the plurality of columns is retained in the memory 16-2b for read-out. In addition, when the A+B signals have been read out from the pixels 10, the (A+B)+(A+B) signal obtained by adding the A+B signals in the plurality of columns is retained in the memory 16-2b for read-out. The imaging apparatus according to the present embodiment generates the A+A signal only in the focus detection region 21, similarly to that in the first embodiment, thereby reduces the number of the data to be read out, and can read out the data at high speed.

In addition, in the present embodiment, the A signals of the pixels 10 in the same row have been combined with each other and the A+B signals have been similarly combined with each other. As another example, it is also acceptable to combine the A signals of the pixels 10 in a plurality of rows with each other and combine the A+B signals similarly with each other. For instance, the adding circuit 19 may combine the A signals of digital data of the pixels 10 in the plurality of rows with each other, and similarly combine the A+B signals to each other. Incidentally, in the present exemplary embodiment, an example has been described in which the digital signals are added to each other, as one example of combination of the digital signals. As another example, the combination of the digital signals may be the averaging of the digital signals.

Fifth Embodiment

Figure 12:
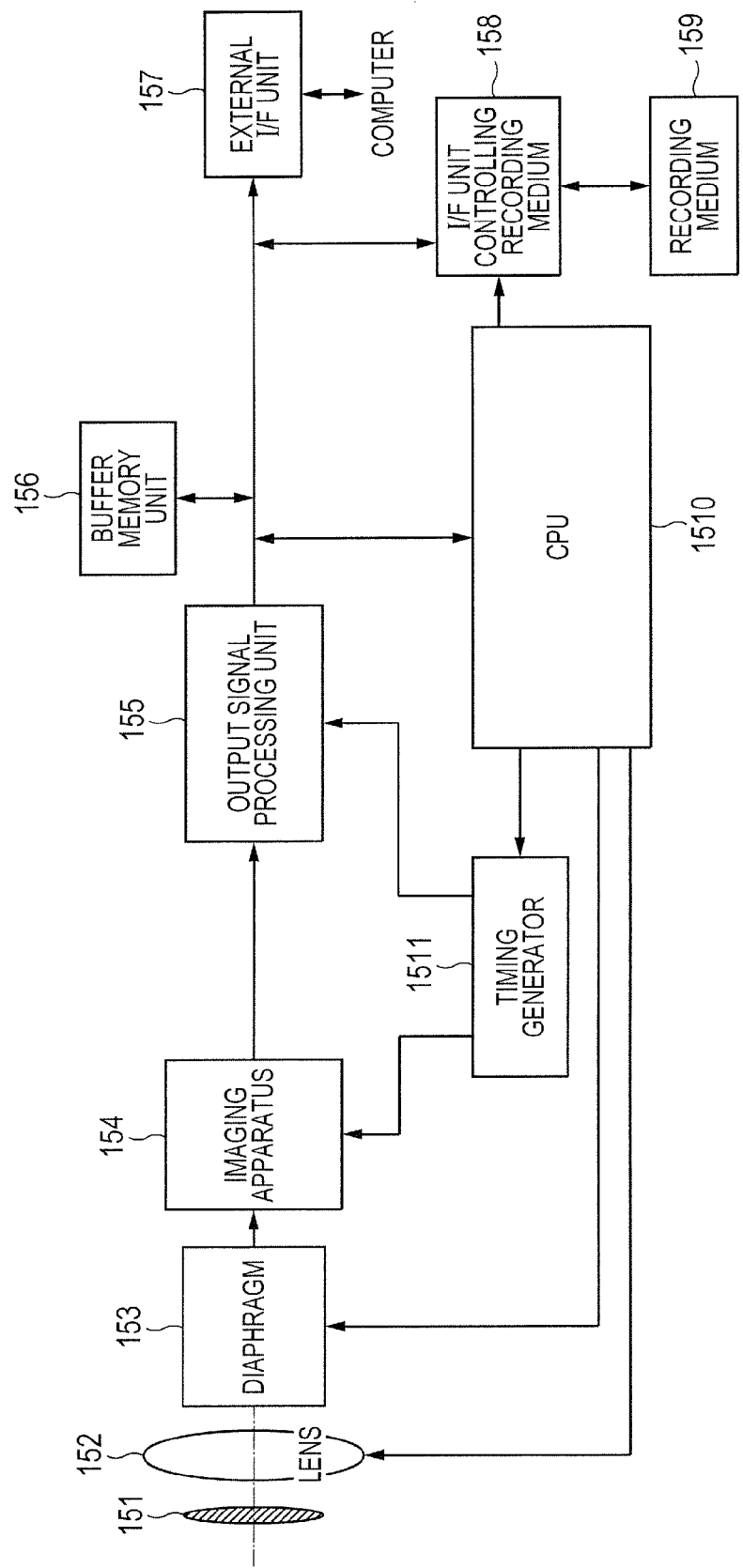
FIG. 12 is a view illustrating one example of an imaging system.

FIG. 12 is a view illustrating a configuration example of an imaging system according to a fifth embodiment of the present invention. The imaging system has the imaging apparatus 154 according to the first to fourth embodiments. Examples of the imaging system include a digital camera, a digital camcorder and a monitoring camera. FIG. 12 illustrates the case where the imaging apparatus 154 is applied to the digital camera, as an example of the imaging system.

The imaging system has a lens 152 for making the imaging apparatus 154 form an optical image of an object thereon, a barrier 151 for protecting the lens 152, and a diaphragm 153 for varying the quantity of light which has passed through the lens 152. The lens 152 and the diaphragm 153 form an optical system which guides the light to the imaging apparatus 154. The imaging system also has an output signal processing unit 155 which performs the process of the output signal which the imaging apparatus 154 outputs. The output signal processing unit 155 has a digital signal processing unit, and performs an operation of variously correcting the signals which the imaging apparatus 154 outputs, compressing the signals, as needed, and outputting the compressed signals.

The imaging system also has a buffer memory unit 156 for temporarily memorizing image data, and a recording medium controlling interface unit 158 for recording signals in or reading signals from a recording medium. The imaging system further has a releasable recording medium 159 such as a semiconductor memory, for recording the image data therein or reading the image data therefrom. The imaging system further has an external interface unit 157 for communicating with an external computer or the like, an overall control/calculation unit 1510 which performs various calculations and controls the whole digital camera, and the imaging apparatus 154. The imaging system further has a timing generator 1511 which outputs various timing signals to the imaging apparatus 154 and the output signal processing unit 155. Here, the timing signal and the like may be input from the outside. The imaging system may have at least the imaging apparatus 154 and the output signal processing unit 155 which processes an output signal that has been output from the imaging apparatus 154. In addition, the output signal processing unit 155 can detect a focus of the optical system by using the (A+A) signal or the (A+A)/2 signal for phase difference detection, which the imaging apparatus 154 outputs. Furthermore, the output signal processing unit 155 can generate an image by using the (A+B)+(A+B) signal or the [(A+B)+(A+B)]/2 signal which the imaging apparatus 154 outputs. As has been described above, the imaging system of the present embodiment has the imaging apparatus 154 applied thereto, and can detect the focus of the optical system and generate the image.

For information, in the first to fifth embodiments, a checkered filter of RGBG can be used as a color filter for the pixels 10. When the color filter is provided on each of the pixels 10 of the imaging apparatus, the photoelectrically converted signals sent from the pixels of the same color can be added to each other.

Note that the above embodiments are merely examples how the present invention can be practiced, and the technical scope of the present invention should not be restrictively interpreted by the embodiments. In other words, the present invention can be practiced in various ways without departing from the technical concept and main features of the invention.

The present invention can provide an imaging apparatus which has an increased speed of an operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-176799, filed Aug. 28, 2013, which is hereby incorporated by reference herein in its entirety.

What is claimed is:

1. An imaging apparatus comprising:
   a plurality of pixels, arranged in rows and columns, each including one microlens and a plurality of photoelectric conversion units generating an electric charge based on an incident light from the one microlens;
   a controlling unit configured to control each of the plurality of pixels to output a first signal based on an electric charge accumulated in one of the plurality of photoelectric conversion units, and a second signal based on a sum of electric charges accumulated in the plurality of photoelectric conversion units;
   a combining unit configured to generate a plurality of first combining signals by combining mutually the first signals of the plurality of pixels, and a plurality of second combining signals by combining mutually the second signals of the plurality of pixels; and
   an output unit configured to output the plurality of second combining signals which corresponds to the columns of the plurality of pixels, and a part of the plurality of first combining signals which correspond to a part of the columns of the plurality of pixels, without outputting the other part of the plurality of first combining signals.

2. The imaging apparatus according to claim 1, wherein the combining unit adds mutually the first signals of the pixels between different columns, and adds mutually the second signals of the pixels between different columns.

3. The imaging apparatus according to claim 1, wherein the combining unit averages mutually the first signals of the pixels between different columns, and averages mutually the second signals of the pixels between different columns.

4. The imaging apparatus according to claim 1, further comprising a plurality of column output lines, to each of which the first and second signals are output respectively from the pixel, and the plurality of column output lines are arranged each corresponding to one of columns, wherein
   the combining unit generates the first and second combining signals by connecting the plurality of column output lines through a capacitor to a same node mutually.

5. The imaging apparatus according to claim 2, further comprising a plurality of column output lines, to each of which the first and second signals are outputted respectively from the pixel, and the plurality of column output lines are arranged each corresponding to one of column, wherein
   the combining unit generates the first and second combining signals by connecting the plurality of column output lines through a capacitor to a same node mutually.

6. The imaging apparatus according to claim 1, further comprising an analog to digital conversion unit configured to convert the first and second signals respectively to digital signals, wherein
   the combining unit generates the first and second combining signals by combining the digital signals generated by the analog to digital conversion unit.

7. The imaging apparatus according to claim 2, further comprising an analog to digital conversion unit configured to convert the first and second signals respectively to digital signals, wherein
   the combining unit generates the first and second combining signals by combining the digital signals generated by the analog to digital conversion unit.

8. The imaging apparatus according to claim 3, further comprising an analog to digital conversion unit configured to convert the first and second signals respectively to digital signals, wherein
   the combining unit generates the first and second combining signals by combining the digital signals generated by the analog to digital conversion unit.

9. The imaging apparatus according to claim 1, further comprising a plurality of column output lines, to each of which the first and second signals are output respectively from the pixel, wherein
   the plurality of column output lines are arranged each corresponding to one of columns, and the combining unit performs the combining by connecting the plurality of column output lines.

10. The imaging apparatus according to claim 3, further comprising a plurality of column output to each of which the first and second signals are output respectively from the pixel, wherein
the plurality of column output lines are arranged each corresponding to one of columns, and
the combining unit performs the combining by connecting the plurality of column output lines.

11. An imaging apparatus comprising:
a plurality of pixels, arranged in rows and columns, each including one microlens, a plurality of photoelectric conversion units generating an electric charge based on an incident light from the one microlens and a pixel amplifying unit outputting a signal based on the electric charge;
a controlling unit configured to control the plurality of pixels so that a plurality of the pixel amplifying units output a plurality of first signals each based on a sum of the electric charge accumulated in ones of the plurality of photoelectric conversion units in the plurality of pixels, and output a plurality of second signals each based on a sum of the electric charge accumulated in the plurality of photoelectric conversion units in the plurality of pixels;
a combining unit configured to generate a plurality of first combining signals by combining mutually the first signals of the plurality of pixels, and a plurality of second combining signals by combining mutually the second signals of the plurality of pixels; and
an output unit configured to output the plurality of second combining signals which correspond to the columns of the plurality of pixels, and a part of the plurality of first combining signals which correspond to a part of the columns of the plurality of pixels, without outputting the other part of the plurality of first combining signals.

12. An imaging system comprising:
an imaging apparatus;
an optical system configured to focus an optical image onto the imaging apparatus; and
an output signal processing unit, wherein
the imaging apparatus comprises:
a plurality of pixels, arranged in rows and columns, each including one microlens and a plurality of photoelectric conversion units generating an electric charge based on an incident light from the one microlens;
a controlling unit configured to control each of the plurality of pixels to output a first signal based on an electric charge accumulated in one of the plurality of photoelectric conversion units, and a second signal based on a sum of electric charges accumulated in the plurality of photoelectric conversion units;
a combining unit configured to generate a plurality of first combining signals by combining mutually the first signals of the plurality of pixels, and a plurality of second combining signals by combining mutually the second signals of the plurality of pixels; and
an output unit configured to output the plurality of second combining signals which correspond to the columns of the plurality of pixels, and a part of the plurality of first combining signals which correspond to a part of the columns of the plurality of pixels, without outputting the other part of the plurality of first combining signals, and
wherein the output signal processing unit detects a focus based on the plurality of first combining signals, and on a difference signal based on a difference between the plurality of first combining signals and the plurality of second combining signals, and generates an image based on the plurality of second combining signals.

13. An imaging system comprising:
an imaging apparatus;
an optical system configured to focus an optical image onto the imaging apparatus; and
an output signal processing unit, wherein
the imaging apparatus comprises:
a plurality of pixels, arranged in rows and columns, each including one microlens, a plurality of photoelectric conversion units generating an electric charge based on an incident light from the one microlens, and a pixel amplifying unit outputting a signal based on the electric charge;
a controlling unit configured to control the plurality of pixels so that a plurality of the pixel amplifying units output a plurality of first signals each based on a sum of the electric charge accumulated in ones of the plurality of photoelectric conversion units in the plurality of pixels, and output a plurality of second signals each based on a sum of the electric charge accumulated in the plurality of photoelectric conversion units in the plurality of pixels;
a combining unit configured to generate a plurality of first combining signals by combining mutually the first signals of the plurality of pixels, and a plurality of second combining signals by combining mutually the second signals of the plurality of pixels; and
an output unit configured to output the plurality of second combining signals which correspond to the columns of the plurality of pixels, and a part of the plurality of first combining signals which correspond to a part of the columns of the plurality of pixels, without outputting the other part of the plurality of first combining signals,
wherein the output signal processing unit detects a focus based on the plurality of first combining signals and on a difference signal based on a difference between the plurality of first combining signals and the plurality of second combining signals, and generates an image based on the plurality of second combining signals.

14. A driving method of an imaging apparatus having a plurality of pixels, arranged in rows and columns, each including one microlens and a plurality of photoelectric conversion units generating an electric charge based on an incident light from the one microlens, comprising:
outputting, by each of the plurality of pixels, a first signal based on an electric charge accumulated in one of the plurality of photoelectric conversion units, and a second signal based on a sum of electric charges accumulated in the plurality of photoelectric conversion units;
generating a plurality of first combining signals by combining mutually the first signals of the plurality of pixels, and a plurality of second combining signals by combining mutually the second signals of the plurality of pixels; and
outputting the plurality of second combining signals which correspond to the columns of the plurality of pixels, and a part of the plurality of first combining signals which correspond to a part of the columns of the plurality of pixels, without outputting the other part of the plurality of first combining signal.

15. The driving method according to claim 14, wherein the generating a plurality of first combining signals is performed by adding mutually the first signals of the pixels between different columns, and the generating a plurality of second combining signals is performed by adding mutually the second signals of the pixels between different columns.

16. The driving method according to claim 14, wherein the generating a plurality of first combining signals is performed by averaging mutually the first signals of the pixels between different columns, and
the generating a plurality of second combining signals is performed by averaging mutually the second signals of the pixels between different columns.

17. The driving method according to claim 14, wherein a plurality of column output lines are provided, to each of which the first and second signals are output respectively from the pixel, the plurality of column output lines being arranged each corresponding to one of columns, and
the first and second combining signals are generated by connecting the plurality of column output lines through a capacitor to a same node mutually.

18. The driving method according to claim 14, further comprising converting the first and second signals respectively to digital signals, wherein
the first combining signal is generated by combining the digital signals based on the first signal, and
the second combining signal is generated by combining the digital signals based on the second signal.

19. The imaging apparatus according to claim 1, wherein the output unit further outputs the plurality of the second combining signals.

20. The imaging apparatus according to claim 11, wherein the output unit further outputs the plurality of the second combining signals.

21. The imaging apparatus according to claim 1, further comprising an analog to digital conversion unit, wherein
the combining unit generates the first and second combining signals as analog signals, and outputs the first and second combining signals to the analog to digital conversion unit,
the analog to digital conversion unit converts the first and second combining signals respectively to digital signals, and
the plurality of second combining signals and the part of the plurality of first combining signals output from the output unit are digital signals.

22. The imaging apparatus according to claim 11, further comprising an analog to digital conversion unit, wherein
the combining unit generates the first and second combining signals as analog signals, and outputs the first and second combining signals to the analog to digital conversion unit,
the analog to digital conversion unit converts the first and second combining signals respectively to digital signals, and
the plurality of second combining signals and the part of the plurality of first combining signals output from the output unit are digital signals.

23. A driving method of an imaging apparatus having a plurality of pixels, arranged in rows and columns, each including one microlens and a plurality of photoelectric conversion units generating an electric charge based on an incident light from the one microlens, and the imaging apparatus further having memory units arranged corresponding to the columns and a horizontal scanning circuit, the driving method comprising:
outputting, by each of the plurality of pixels, a first signal based on an electric charge accumulated in one of the plurality of photoelectric conversion units, and a second signal based on a sum of electric charges accumulated in the plurality of photoelectric conversion units;
generating a plurality of first combining signals by combining mutually the first signals of the plurality of pixels, and a plurality of second combining signals by combining mutually the second signals of the plurality of pixels;
holding, by the memory units, the plurality of second combining signals;
holding, by at least a part of the memory units configured to hold the plurality of second combining signals, the plurality of first combining signals;
scanning, by the horizontal scanning circuit, the part of the memory units holding the plurality of first combining signals without scanning the other part of the memory units; and
scanning, by the horizontal scanning circuit, the memory units holding the plurality of second combining signals.

* * * * *